Jan. 2, 1962     B. N. ASHTON     3,015,311
SHIMMY DAMPENING DEVICE FOR AIRCRAFT LANDING GEAR
Filed April 28, 1959     2 Sheets-Sheet 1
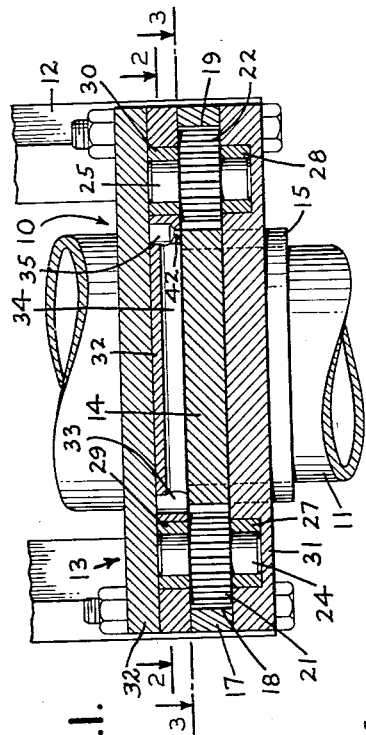
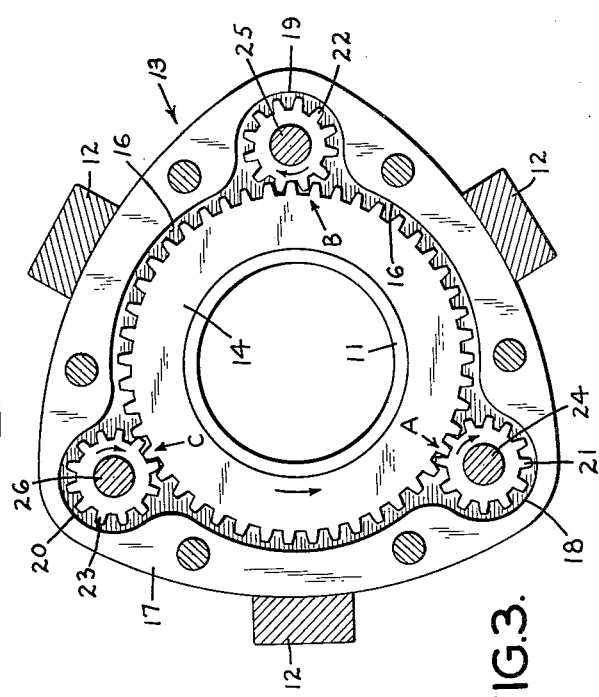
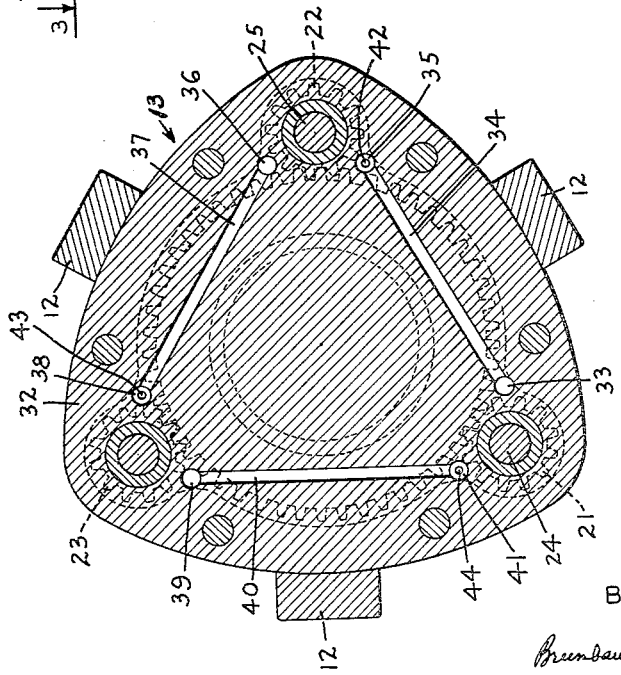
INVENTOR
BENJAMIN N. ASHTON
BY
HIS ATTORNEYS

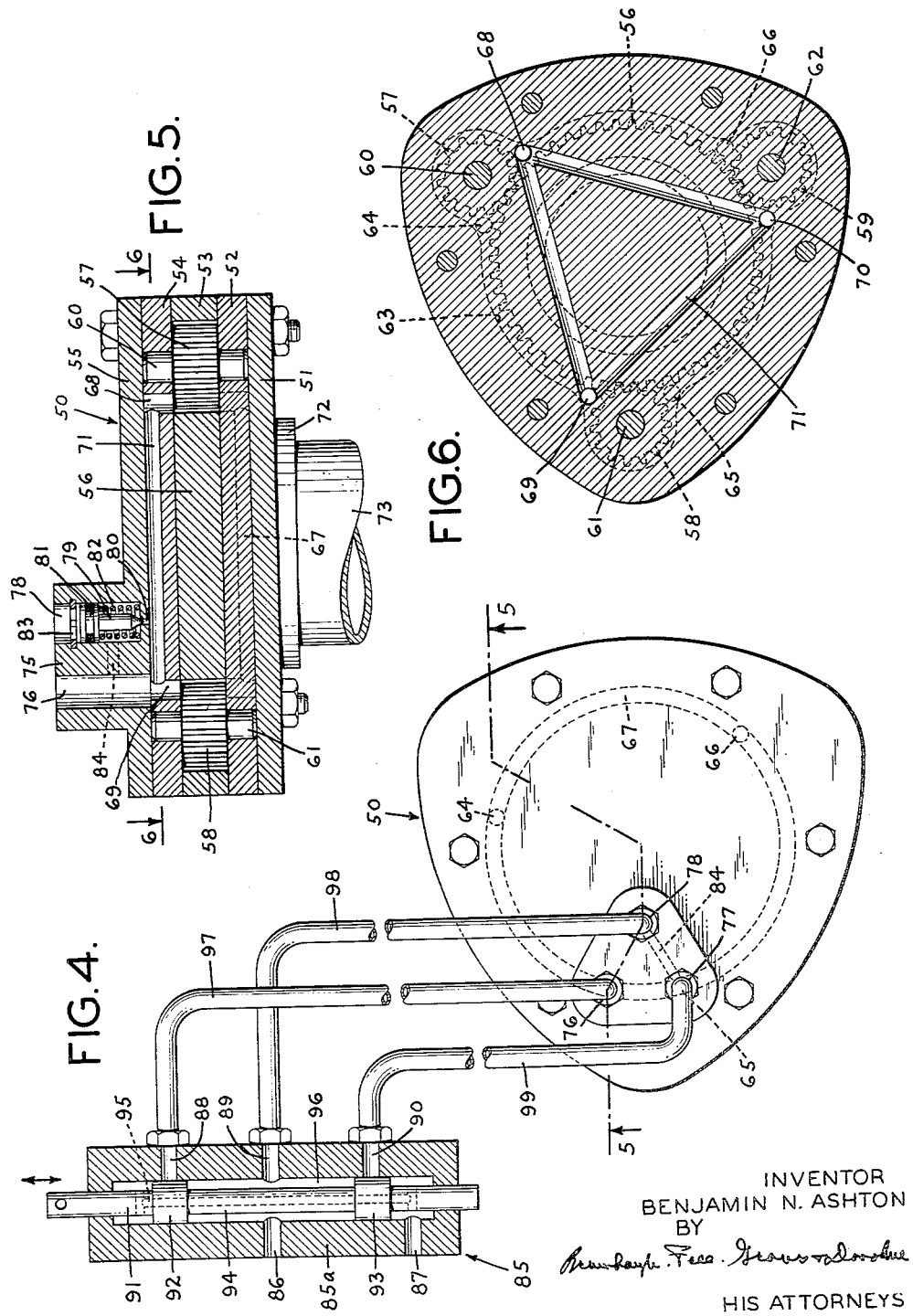

United States Patent Office 3,015,311
Patented Jan. 2, 1962

3,015,311
SHIMMY DAMPENING DEVICE FOR AIRCRAFT LANDING GEAR
Benjamin N. Ashton, Kingston, N.Y., assignor, by mesne assignments, to Electrol Incorporated, a corporation of New York
Filed Apr. 28, 1959, Ser. No. 809,511
12 Claims. (Cl. 121—39)

This invention relates to improvements in steerable landing gear of aircraft and the like and it relates particularly to a mechanism for dampening vibration or shimmy in such landing gear.

In many types of aircraft, the nose landing gear of the craft is retractable and it is also arranged so that it can be steered or turned by the pilot to enable the aircraft to be steered while taxiing. During landing and takeoff the high speed, the roughness of the runways and many other factors may cause steerable landing gear to vibrate or shimmy, thereby making it difficult to steer the aircraft and subjecting the landing gear to severe stresses.

In accordance with the present invention, a simplified form of anti-shimmy or vibration dampening device is provided which can be readily included in the steerable nose landing gear of an aircraft, and, with appropriate modification, can be used also to steer the aircraft.

More particularly, in accordance with the present invention, an anti-shimmy mechanism is provided in which a member mounted on the steerable landing gear is adapted to drive a plurality of gear pumps carried by the landing gear structure, the inlets and outlets of these pumps being connected together by means of passageways or conduits to form a circuit through which liquid is circulated by operation of the gear pumps in response to movement of the steerable portion of the landing gear. By suitably proportioning the passageways or providing a restricted orifice in one or more of the passages, the rate of flow and thus the resistance to operation of the pumps can be controlled so that they resist rapid rotary or shimmying movement of the landing gear. Inasmuch as the normal steering movement of the landing gear is relatively slow, the gear pumps and the restricted passageways or orifices do not restrict or retard the steering movement but they nevertheless prevent high frequency oscillation of the landing gear which is characteristic of the shimmying action of the landing gear.

By suitably varying the number and size of the pumps and the restrictions in the passageways between the pumps, the vibration dampening or anti-shimmying effect of the mechanism can be varied to satisfy the requirements of both small and large aircraft. Inasmuch as a gear pump may also serve as a reversible motor, the shimmy dampening device can be connected in a hydraulic circuit provided with a control valve which enables the shimmy-dampening mechanism to act as a steering motor for the landing gear.

For a better understanding of the present invention, reference may be had to the accompanying drawing, in which:

FIGURE 1 is a sectional view of a typical anti-shimmy device of a type embodying the present invention shown as applied to a portion of the landing gear structure of an aircraft; and FIGURE 2 is a view in section taken on line 2—2 of FIG. 1;

FIGURE 3 is a view in section taken on line 3—3 of FIG. 1;

FIGURE 4 is a plan view of a steering and anti-shimmy device embodying the invention and including a selector valve shown in section;

FIGURE 5 is a view in section taken on line 5—5 of FIGURE 4; and

FIGURE 6 is a view in section taken on line 6—6 of FIGURE 5.

The form of anti-shimmy device 10 illustrated in FIGURES 1 to 3 is installed in a retractable landing gear structure including an oleo strut portion 11 on which the landing wheel or wheels, not shown, are mounted and upon frame members 12 forming part of the landing gear or air frame structure relative to which the leg 11 is rotatable in order to steer the aircraft. The type of landing gear structure to which the anti-shimmy device is applied may be varied widely and the mechanism 10 may be used either with retractable or non-retractable landing gear as may be desired.

The anti-shimmy device 10 includes a casing 13 formed of a series of plates in which is rotatably mounted a gear member 14 having a hub or collar 15 fixed non-rotatably to the leg 11 of the landing gear. The gear member 14 is mounted in a cavity 16 (FIG. 3) in a plate 17 forming the mid-portion of the casing 13.

The plate 17 is of a somewhat triangular shape but it can be of other shapes as will appear hereinafter.

As shown in FIGURE 3, the central circular recess or cavity 16 in the plate 17 has a plurality of semi-circular chambers 18, 19 and 20 arranged around its periphery in substantially equally spaced relation. Pinions or gears 21, 22 and 23 are rotatably mounted in the chambers 18 to 20 and mesh with the gear 14 to form therewith three gear pumps A, B and C. As will be apparent from FIGURES 1 and 3, the gears 21, 22 and 23 are provided with shafts 24, 25 and 26, respectively, which are rotatably received in anti-friction bearings 27 and 28, in the cover plates 31 and 32 which are disposed below and above the plate 17 as viewed in FIGURE 1, and close the upper and lower ends of the cavity 16 and the chambers 18, 19 and 20, thereby forming the casings of the pumps A, B and C. While the drawings show substantial clearances between the teeth of the gears 14 and 21 to 23 and the walls of the cavity 16 and the chamber 18 to 20, it will be understood that the clearances actually are very small to assure efficient operation of the gear pumps. As best shown in FIGURE 2, each of the gear pumps A, B and C is provided with inlet and outlet ports. Gear pump A (FIG. 3) has a port 33 (FIG. 2) connected by means of a passage 34 in the cover plate 32 with a port 35 of gear pump B. Port 36 of gear pump B is connected by means of a passage 37 with a port 38 of the gear pump C. The other port 39 of the gear pump C is connected by means of a passage 40 with a port 41 of the gear pump A. In this way, the inlet of one pump is connected to the outlet of an adjacent pump so that upon rotation of the gear 14 and consequent operation of the gear pumps A, B and C in either direction, liquid will be circulated in a continuous flow path from one pump to another.

Inasmuch as there will be some frictional resistance to flow of liquid through the passages and pumps, a retarding effect will be exerted on the rotation of the gear 14 relative to the casing 13. By providing the passages 34, 37 and 40 with restricted orifices 42, 43 and 44, a further retarding of the flow of the liquid in response to the operation of the pumps may be provided so that quick rotation of the gear 14 and the landing gear relative to the casing is effectively precluded, without, however, preventing relatively slower movement of the landing gear such as is required for proper steering of the aircraft. In this way, the high frequency or quick rotation of the leg 11 of the landing gear is prevented and shimmying which is characterized by rapid oscillation of the leg 11 around its axis is effectively prevented.

While the form of the invention described above includes three gear pumps arranged in a substantially triangular relation, it will be understood that similar but less powerful anti-shimmy action can be obtained by providing only one or two gear pumps having their inlets and outlets connected to form a closed circuit. A more powerful anti-shimmying action can be produced by using more than three gear pumps. Moreover, it will be understood that the gear 14 need not be a part of the gear pumps. Thus, the gear pumps may be composed of two small meshing gears and the gear 14 may be used to drive one gear of each of the pumps. Also, appropriate mechanical linkages may be interposed between the landing gear and the anti-shimmy mechanism so that the latter may be mounted in a position other than coaxial with the landing gear leg.

Anti-shimmy devices of the type described above can be modified to serve as steering motors for aircraft. The form of the invention illustrated in FIGURES 4 to 6 is both a steering and shimmy dampening device. This device includes a casing 50 which is formed of a series of generally triangular plates 51, 52, 53, 54 and 55. The plate 53 is provided with an opening for receiving a gear 56 which meshes with a series of small gears 57, 58 and 59 and thereby forms a series of gear pumps. The gears 57 to 59 are provided with shafts 60, 61 or 62, respectively, which are rotatably received in bearings or the like mounted in the plates 52 and 54 which form the closure or opposite sides of the gear-receiving cavity 63 in the plate 53.

Each of the gear pumps formed by the small gear 57 to 59 and the large gear 56 is provided with inlet and outlet ports. Thus, the plate 52, as shown in FIGURE 6 is provided with a series of ports 64, 65 and 66 connected by a continuous annular passage 67 formed in the plate 52. Similarly, the plate 54 is provided with a series of ports 68, 69 and 70 which are connected by means of a continuous triangular passage 71 formed in the plate 54. The outer open sides of the passages 67 and 71 are closed by the cover plates 51 and 55, respectively. As shown in FIGURE 5, the cover plate 51 has a collar 72 and a central opening through which extends a shaft or cylinder 73 on which the wheel of the landing gear is supported. The shaft 73 is fixed to the gear 56 and rotates with it. The casing 50 itself may be mounted on the nose wheel landing gear of the aircraft in any suitable way, as described above.

In order to provide a shimmy dampening action, the device shown in FIGURES 4, 5 and 6 is provided with a somewhat different type of flow restricting means. Referring to FIGURES 4 and 5, it will be seen that the cover plate 55 is provided with a boss 75 having a series of three ports 76, 77 and 78 therein. The port 78 carries a poppet type check valve including a valve plunger 79 having a pointed or needle-like tip cooperating with an aperture 80 which communicates with the flow passage 71. The needle valve member 79 is provided with a piston portion 81 which is slidable in the port 78 and against which bears a spring 82 normally biasing the needle valve 79 away from the port 80. A retaining ring 83 is mounted in the port 78 to hold the valve member 79 in it. Also, a passage 84 connects the port 80 with the port 77 so that liquid can flow between the port 77 and the passage 71 when the valve is open.

The port 77 is connected to the passage 67 in the plate 52. Port 76 is connected to passage 71.

As shown in FIGURE 4, a selector valve 85 is provided to control the operation of the steering and shimmy dampening device. The selector valve 85 is of the slide type having a casing 85a provided with a pressure port 86 to which a liquid under pressure is supplied, a return port 87, and three motor control ports 88, 89 and 90. A slide valve member 91 is mounted in the casing 85a and has a pair of piston portions 92 and 93 which can be moved selectively into a position closing or covering the ports 88 and 90 and a position uncovering the ports 88 and 90. Also, the stem 94 of the valve is provided with passage 95 communicating with the bore 96 of the valve casing 85a on opposite sides of the pistons 92 and 93. The port 88 is connected by means of a flexible conduit 97 to the port 76. Valve port 89 is connected by means of conduit 98 to the port 78 and port 90 is connected by means of conduit 99 to the port 77 of the anti-shimmy and steering device.

With the parts of the device including the selector valve 85 in the position shown, it will be apparent that fluid pressure applied at the port 86 of the selector valve 85 will be applied also at the port 78 of the steering and anti-shimmy device to urge the valve 79 into a position to close the port 80. When the selector valve is shifted, for example downwardly, to uncover the ports 88 and 90, the port 88 will be connected to return port 87 and the port 90 to the pressure or system port 86. In this position, fluid pressure will be applied to the ports 78 and 77 and to the passage 67 and ports 64, 65 and 66 of the multiple gear pump. Passage 76 which communicates with the passage 71 in the anti-shimmy and steering device is connected to the return port 87. In this way, unequal pressures are applied to opposite sides of the gears making up the three gear pumps of the assembly and cause the gear 56 and the shaft 73 thereon to rotate. Rotation continues until the valve plunger is returned to the central position shown in FIG. 4.

When the selector valve plunger is moved upwardly from the position shown in FIGURE 4, a reverse operation of the gear pump and a turning movement in the opposite direction will be achieved.

With the valve restored to the position shown in FIGURE 4 and with the system pressure at the port 86 reduced to zero as by means of a shut off valve, not shown, the port 78 will be relieved of pressure and the valve 79 therein will be unseated from the restricted orifice 80. The orifice 80 together with the passage 84 constitutes sole connection between the passages 67 and 71 so that liquid flow caused by rotation of the shaft 73 is retarded by the orifice 80 thereby producing an anti-shimmying action like that obtained with the device shown in FIGURES 1 to 3.

From the preceding description of typical forms of the invention, it will be apparent that the shimmy dampening and/or steering devices embodying the invention are susceptible to modification in accordance with the space and operating requirements of aircraft. Accordingly, the forms of the invention described herein should be considered as illustrative and not as limiting the scope of the following claims.

I claim:

1. An anti-shimmy mechanism for steerable landing gear of aircraft comprising a casing, a gear member rotatable in said casing, a plurality of pinions rotatably mounted in said casing and meshing with said gear member and forming therewith a plurality of gear pumps each having an inlet and an outlet, and passages in said casing directly connecting the inlet of each of said gear pumps to the outlet of at least one of the other gear pumps to form a flow circuit for circulation of liquid therethrough, and means in at least one of said passages for restricting flow of liquid through said passages to resist relative rotation of said gear member of said casing.

2. The mechanism set forth in claim 1 comprising a source of hydraulic fluid under pressure, and means including a selector valve connected to said inlets and outlets for supplying hydraulic pressure selectively to the inlets and to the outlets of said pumps to rotate said gear member in either direction.

3. An anti-shimmy mechanism for steerable landing gear of aircraft comprising a casing, a gear member rotatable in said casing, a plurality of pinions rotatably mounted in said casing and meshing with said gear member and forming therewith a plurality of gear pumps each having an inlet and an outlet, and passages in said casing connecting the inlet of each of said gear pumps directly to the outlet of another of said gear pumps to form a flow circuit for circulation of liquid therethrough.

4. An anti-shimmy mechanism for steerable landing gear of aircraft comprising a casing, a gear member rotatably mounted in said casing, a plurality of chambers in said casing adjacent to the periphery of said gear member, gears rotatably mounted in said chambers and meshing with said gear member, each chamber, the gear therein and said gear member forming a gear pump, passages in said casing communicating with said chambers, each passage joining the inlet of one of said pumps directly to the outlet of another of said pumps to form a fluid circuit through which fluid is circulated by relative rotation of said gear member and said casing.

5. The anti-shimmy device set forth in claim 4 comprising a restriction in one of said passages for restricting flow of fluid therethrough.

6. The anti-shimmy mechanism set forth in claim 4 comprising a selector valve for connecting the inlets of said pumps to a source of hydraulic fluid under pressure and venting the outlets of said pumps and vice versa to rotate said gear member selectively in either direction.

7. An anti-shimmy mechanism for aircraft landing gear comprising a casing having a substantially circular cavity therein, a gear member rotatably mounted in said casing and substantially filling said cavity, a plurality of chambers in said casing in angularly spaced relation around the periphery of said cavity, a gear rotatably mounted in and substantially filling each of said chambers and meshing with said gear member, said gear member and each gear and chamber forming a gear pump, ports in said casing communicating with each chamber on opposite sides of each gear therein and forming the inlet and outlet ports of each gear pump, and passages in said casing connecting the outlet port of each gear pump directly to the inlet port of the gear pump adjacent thereto.

8. An anti-shimmy mechanism for steerable landing gear of aircraft comprising a casing, a plurality of gear pumps in said casing each having an inlet and an outlet and passages connecting the inlet of each pump directly to the outlet of another of said pumps, said gear pumps each having a gear member common to all of said gear pumps, said gear member being rotatable relative to said casing.

9. The anti-shimmy mechanism set forth in claim 8 comprising a restriction in one of said passages for restricting relative rotation of said gear member and said casing.

10. An anti-shimmy mechanism for steerable landing gear for aircraft comprising a plurality of gear pumps in fixed relation to each other, each pump having a pair of meshing gears and an inlet and an outlet, a first passage connecting all of the inlets of said pumps directly to each other, a second passage connecting all of the outlets of said pumps directly to each other, a restricted orifice directly connecting said first and second passages and a member rotatable relative to all of said pumps and connected to one gear of each pump for rotating said gears in response to rotation of said member relative to said pumps.

11. The anti-shimmy mechanism set forth in claim 10 comprising a pressure-responsive valve for closing said orifice to restrict the flow of fluid therethrough and a selector valve connected to said passages for supplying pressure to actuate said pressure-responsive valve to close and open said orifice and selectively to said first and second passages to rotate said gear pumps selectively in either direction.

12. An anti-shimmy mechanism for steerable landing gear for aircraft comprising a plurality of gear pumps in fixed relation to each other, each pump having a pair of meshing gears and an inlet and an outlet, a member rotatable relative to all of said pumps and connected to one gear of each pump for rotation therewith, passages connecting the outlet of each gear pump directly to the inlet of at least one other gear pump, and means in at least one of said passages for restricting flow of liquid through said passages to resist rotation of the gears of said gear pumps.

References Cited in the file of this patent

UNITED STATES PATENTS

| 2,399,008 | Doran | Apr. 23, 1946 |
| 2,681,621 | Hedman | June 22, 1954 |
| 2,728,300 | Stoermer | Dec. 27, 1955 |
| 2,745,355 | Mosbacher | May 15, 1956 |
| 2,756,949 | Smith | July 31, 1956 |
| 2,854,956 | Hager | Oct. 7, 1958 |

FOREIGN PATENTS

| 449,069 | Great Britain | June 19, 1936 |
| 638,325 | Great Britain | June 17, 1950 |
| 761,425 | Great Britain | Nov. 14, 1956 |